2 Sheets--Sheet 1.
W. M. THOMPSON.
Cart-Shute.
No. 165,632.      Patented July 13, 1875.
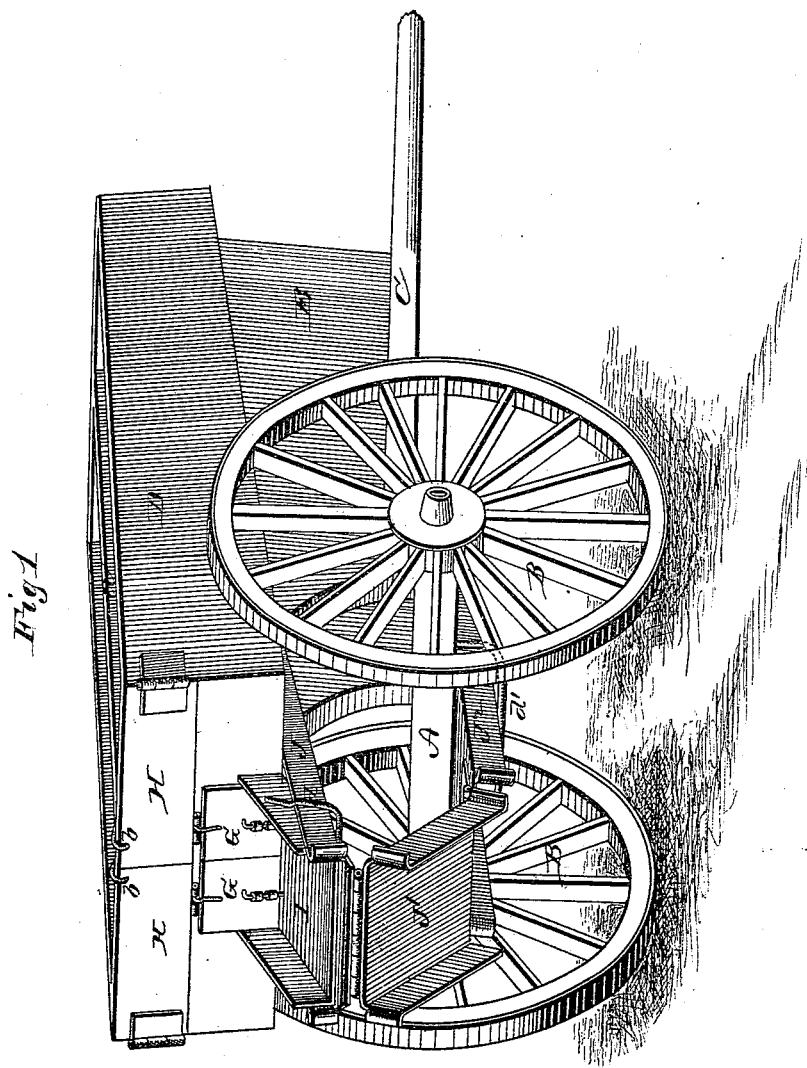
WITNESSES      INVENTOR W. M. THOMPSON.
Cart-Shute.
No. 165,632.
2 Sheets--Sheet 2.
Patented July 13, 1875.
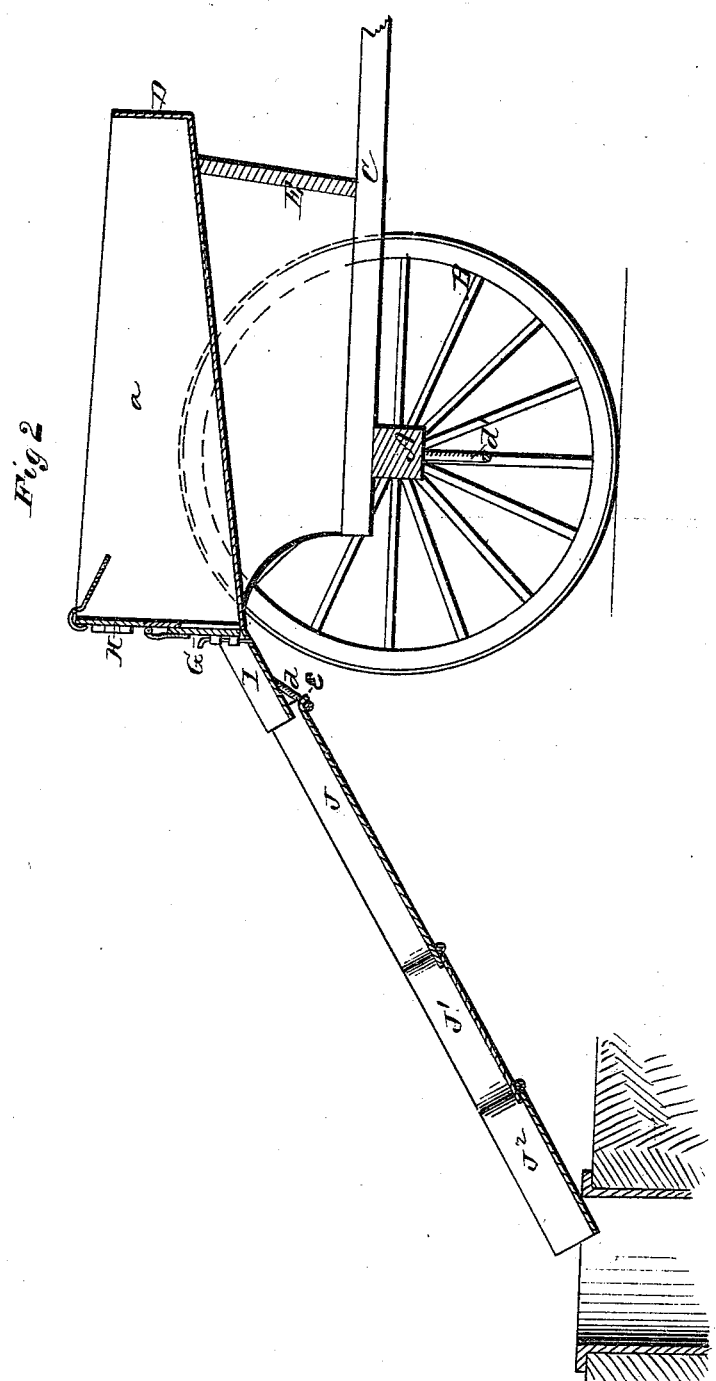
WITNESSES
Franck L. Ourand.
C. L. Evert.
INVENTOR
Wm. M. Thompson.
By Alexander Mason
Attorney
N. PETERS, PHOTO-LITHOGRAPHER, WASHINGTON, D.C.

UNITED STATES PATENT OFFICE.

WILLIAM M. THOMPSON, OF CARLISLE, PENNSYLVANIA.

IMPROVEMENT IN CART-CHUTES.

Specification forming part of Letters Patent No. 165,632, dated July 13, 1875; application filed June 18, 1875.

*To all whom it may concern:*

Be it known that I, WILLIAM M. THOMPSON, of Carlisle, in the county of Cumberland and in the State of Pennsylvania, have invented certain new and useful Improvements in Coal-Wagons; and do hereby declare that the following is a full, clear, and exact description thereof, reference being had to the accompanying drawings and to the letters of reference marked thereon making a part of this specification.

The nature of my invention consists in the construction and arrangement of a combined coal-cart and chute, as will be hereinafter more fully set forth.

In order to enable others skilled in the art to which my invention appertains to make and use the same, I will now proceed to describe its construction and operation, referring to the annexed drawings, in which—

Figure 1 is a perspective view of my invention; and Fig. 2 is a longitudinal section of the same.

A represents the axle of my cart, provided with wheels B B, and shafts C C, suitably attached to the axle. On top of the axle and shafts is arranged a frame, E; and on top of this frame is secured the cart body or box D. The bottom of this box or body is made inclined downward from front to rear, and divided by a central longitudinal partition, $a$, into two compartments, each of which is, at its lower rear end, provided with a hinged door, G, opening upward, as shown. At the top the rear end of each compartment is provided with a door, H, hinged to the side, and fastened by a spring-catch, $b$. To the lower rear end of the cart-box D is attached a stationary spout, I, sufficiently large to embrace both doors G, and allow the coal from both the compartments of the coal-cart to be emptied therein. Under the spout I is a fender, $d$, through which is passed one section, J, of a sectional chute, formed of two, three, or more sections, the other sections, $J^1$ $J^2$, &c., being hinged so as to form, when extended, a straight continuous chute, which is held to the fender $d$ by a curved plate or hook, $e$, formed on or attached to the inner end of the upper or first section J.

The sectional chute is to be extended across the sidewalk to the coal-hole, as shown in Fig. 2, so that the cart can be emptied without having to be run up on the sidewalk.

The upper section J of the chute may be pushed inward through the fender $b$ under the body or box D, and the sections $J^1$ $J^2$ turned under, so that the last section may be inserted in a fender, $d'$, attached to the under side of the axle A, as shown in Fig. 1.

Having thus fully described my invention, what I claim as new, and desire to secure by Letters Patent, is—

1. In combination with the inclined box D and its doors G G, the stationary spout I, the bail or fender $d$, and the detachable chute J, having hook $e$, all substantially as and for the purposes herein set forth.

2. The combination of the box and its doors, the stationary spout I, the sectional hinged chutes J $J^1$ $J^2$, and the fender $d'$ under the axle for securing the chutes, all substantially as described.

In testimony that I claim the foregoing I have hereunto set my hand this 21st day of May, 1875.

WILLIAM M. THOMPSON.

Witnesses:
 M. BOSLER,
 A. L. SPONSLER.